US012625082B2

(12) United States Patent
Lee et al.

(10) Patent No.: US 12,625,082 B2
(45) Date of Patent: May 12, 2026

(54) OPTICAL DETECTION CHIP AND OPTICAL DETECTION SYSTEM

(71) Applicants: THE UNIVERSITY OF KITAKYUSHU, Kitakyushu (JP); TOYOKO KAGAKU CO., LTD., Kawasaki (JP)

(72) Inventors: Seung-Woo Lee, Kitakyushu (JP); Kiyoshi Hirakawa, Kawasaki (JP); Hirofumi Okuda, Kawasaki (JP)

(73) Assignees: THE UNIVERSITY OF KITAKYUSHU, Kitakyushu (JP); TOYOKO KAGAKU CO., LTD., Kawasaki (JP)

( * ) Notice: Subject to any disclaimer, the term of this patent is extended or adjusted under 35 U.S.C. 154(b) by 185 days.

(21) Appl. No.: 18/294,213

(22) PCT Filed: Aug. 9, 2022

(86) PCT No.: PCT/JP2022/030443
§ 371 (c)(1),
(2) Date: Feb. 1, 2024

(87) PCT Pub. No.: WO2023/017823
PCT Pub. Date: Feb. 16, 2023

(65) Prior Publication Data
US 2024/0344997 A1 Oct. 17, 2024

(30) Foreign Application Priority Data
Aug. 11, 2021 (JP) ................................. 2021-131390

(51) Int. Cl.
*G01N 21/78* (2006.01)
*G01N 31/22* (2006.01)
*G01N 21/77* (2006.01)

(52) U.S. Cl.
CPC ......... *G01N 21/783* (2013.01); *G01N 31/224* (2013.01); *G01N 2021/7763* (2013.01)

(58) Field of Classification Search
CPC ............... G01N 21/783; G01N 31/224; G01N 2021/7763
See application file for complete search history.

(56) References Cited

U.S. PATENT DOCUMENTS 4,764,343 A * 8/1988 Nyberg ................ G01N 21/783
422/94
2010/0054999 A1 3/2010 Uchiyama et al.
(Continued)

FOREIGN PATENT DOCUMENTS

CN 206557108 U 10/2017
EP 3293512 A1 * 3/2018 ........... G01N 21/783
(Continued)

OTHER PUBLICATIONS

Hopmann, K. et al. "For the determination of hydrogen sulfide with N,N-dimethyl-phenylenediamine and iron (III) chloride" Institute for Chemistry and Physics of the Federal Institute for Fleisoh Research, Kulmbach Received on Jun. 20, 1967, pp. 168-172.
(Continued)

*Primary Examiner* — Georgia Y Epps
*Assistant Examiner* — Don J Williams
(74) *Attorney, Agent, or Firm* — CANTOR COLBURN LLP

(57) ABSTRACT

Provided is an optical detection chip that makes it possible to accurately measure, in a short time, hydrogen sulfide and methyl mercaptan contained in a gas subject to detection. An optical detection chip is provided with: an optically transparent substrate; and a layer structure provided with a pigment layer that is formed on the optically transparent substrate, that includes organic pigment molecules contain-
(Continued)

14 ing amino groups, ketone groups, or quinones, as well as metal ions of at least one kind selected from the group consisting of Mn, Fe, Co, Ni, Cu, Zn, Cd, Hg, Ag, Pb, and Tl, and that exhibits a color change in response to a gas subject to detection including at least one of hydrogen sulfide and methyl mercaptan.

13 Claims, 14 Drawing Sheets

(56) References Cited

U.S. PATENT DOCUMENTS

| | | | |
|---|---|---|---|
| 2010/0189600 A1* | 7/2010 | Hulteen | G01N 21/783 |
| | | | 422/420 |
| 2011/0085759 A1 | 4/2011 | Lee et al. | |
| 2017/0212272 A1 | 7/2017 | Monteiro et al. | |
| 2020/0300774 A1 | 9/2020 | Hsu et al. | |

FOREIGN PATENT DOCUMENTS

| | | | |
|---|---|---|---|
| JP | S55005351 B2 | 1/1980 | |
| JP | S5637553 B2 | 4/1981 | |
| JP | S56153856 A | 11/1981 | |
| JP | S59084467 A | 6/1984 | |
| JP | 2732878 B2 | 3/1998 | |
| JP | 2001108582 A | 4/2001 | |
| JP | 2003075342 A | 3/2003 | |
| JP | 4044702 B2 | 11/2007 | |
| JP | 2008128884 A | 6/2008 | |
| JP | 2010281794 A | 12/2010 | |
| JP | 5219033 B2 | 3/2013 | |
| JP | 5388309 B2 | 10/2013 | |
| JP | 2020153986 A | 9/2020 | |
| JP | 2020180963 A | 11/2020 | |
| KR | 100608434 B1 | 7/2006 | |
| KR | 100981300 B1 | 9/2010 | |

OTHER PUBLICATIONS

International Search Report for International Application No. PCT/JP2022/030443; Mail date, Oct. 25, 2022; 11 pages.

JPO Notice of Reasons for Refusal for corresponding JP Application No. 2023-511601; Dated Sep. 19, 2023; 12 pages.

Korposh, S. et al. "Fibre-Optic Chemical Sensor Approaches Based on Nanoassembled Thin Films: A Challenge to Future Sensor Technology" INTECH, Current Development in Optical Fiber Technology, Chapter 9, 2013, pp. 237-264.

Korposh, S. et al. "Optical fibre long period grating with a nanoporous coating formed from silica nanoparticles for ammonia sensing in water" ELSEVIER, Materials Chemistry and Physics 133 (2012) pp. 784-792.

Lohitesh, K. et al. "Detection and removal of hydrogen sulphide gas from food sewage water collected from Vellore", Scholars Research Library, Der Pharmacia Lettre, 2013 5(3):pp. 163-169.

Okuda et al. "Selective Methanol Gas Detection using a U-bent Optical Fiber Modifiedwith a Silica Nanoparticle Multilayer", Journal of the IEEJ, May 2016, col. 135, No. 5, pp. 166-171.

Rodriguez-Fernandez, J. "A sorbent tube for oral malodour monitoring" ELSEVIER, Talanta 62 (2004) pp. 421-426.

Rodriguez-Fernandez, J. "Optical fiber sensor for hydrogen sulfide monitoring in mouth air" ELSEVIER, Analytica Chimica Acta, 471 (2002) pp. 13-23.

Suresha, M.S. et al. "A New Spectrophotometric Method for Hydrogen Sulphide Through Electrolytically Generated Mn(III) With O-Tolidine", E-Journal of Chemistry, vol. 5, No. 1, pp. 93-99, Jan. 2008.

Wang, T. "Chemical information of low molecular weight metabolites: Elucidation of disease correlation and sensor approaches for detection" Doctoral dissertation; International Information Research Dept. The University of Kitakyushu; 590 pages.

Xie, J. "A new methods for determining hydrogen sulfide release in cultured cells" Journal of Peking University (Medical Edition), 2013, vol. 45, No. 3, pp. 489-492.

Engel Laura et al: "Screen-Printed Sensors for Colorimetric Detection of Hydrogen Sulfide in Ambient Air", SENSORS, vol. 19, No. 5, Mar. 8, 2019 (Mar. 8, 2019), p.1182, XP093293159, CH ISSN: 1424-8220, DOI: 10.3390/s19051182 Retrieved from the Internet: URL: https://www.mdpi.com/1424-8220/19/5/1182/pdf> * paragraph [02.1] *.

EPO Partial Supplementary European Search Report for corresponding EP Application No. 228558854 issued Jul. 16, 2025.

Kaushik Rahul et al: "Selective Detection of H 2 S by Copper Complex Embedded in Vesicles through Metal Indicator Displacement Approach", ACS SENSORS, vol. 3, No. 6, Jun. 1, 2018 (Jun. 1, 2018), pp. 1142-1148, XP093293152, US ISSN: 2379-3694, DOI: 10.1021/acssensors.8b00174 Retrieved from the Internet: URL:https://pubs.acs.org/doi/pdf/10.1021/acssensors.8b00174> * p. 1142 * * paragraph "Results and discussion" *.

EPO Extended European Search Report for corresponding EP Application No. 22855885.4; Issued Oct. 10, 2025.

* cited by examiner (a)

(b)

(a)

(b)

(c)

(a)

(b)

(a)

(b)

OPTICAL DETECTION CHIP AND OPTICAL DETECTION SYSTEM

CROSS REFERENCE TO RELATED APPLICATIONS

This is the U.S. national stage of application No. PCT/JP2022/030443, filed on Aug. 9, 2022. Priority under 35 U.S.C. § 119 (a) and 35 U.S.C. § 365(b) is claimed from Japanese Application No. 2021-131390, filed Aug. 11, 2021, the disclosure of which is also incorporated herein by reference.

TECHNICAL FIELD

The present invention relates to an optical detection chip and an optical detection system.

BACKGROUND ART

In recent years, in the field of medicine and health, detection methods using gases subject to detection have been developed, such as those detecting a cause of an infectious disease represented by influenza by detecting various viruses contained in an oral gas, those detecting hydrogen sulfide, methyl mercaptan, and dimethyl sulfide contained in an oral gas and indicating concentrations of the above-described oral gas components, and those diagnosing asthma by detecting nitric oxide (NO) contained in an exhaled gas. However, since an oral gas, which is one of the gases subject to detection, contains numerous types of volatile organic compounds such as ammonia, phenol, ethyl alcohol, trimethylamine, and acetone, in addition to hydrogen sulfide, dimethyl sulfide, and methyl mercaptan, it is difficult to measure them separately. For this reason, it has been difficult for analyses of the gases subject to detection including the oral gases to be put to practical use.

On the other hand, layer structures for capturing changes in electrical, magnetic, chemical, and optical properties by forming a thin layer on a substrate and placing a specific compound in the thin layer have been known. Patent Document 1 discloses an atmospheric sensor including a portion in which a cationic compound film and an anionic compound film are alternately laminated multiple times on the surface of a core-exposed portion formed on a portion of a clad of an optical fiber or an optical waveguide. Patent Document 1 provides the atmospheric sensor that is compact and lightweight and yet capable of detecting gas and humidity with high sensitivity. Patent Document 2 discloses a particulate film formed by the adsorption of particulates on the surface of a carrier and an organic compound film formed by the adsorption of an organic compound. Patent Document 2 expands a surface area of the organic compound film to which a certain molecule is adsorbed and provides a sensor with high sensitivity with a small number of layers.

In Non-Patent Document 1, a hydrogen sulfide gas in an oral gas is analyzed by adding a copper (Cu) ion to a reagent for a colorimetric analysis, including 2,6-dichloroindophenol (hereinafter referred to as "DCIP") and fixing them to a silica gel support. However, Non-Patent Document 1 does not disclose any information regarding the distinction between hydrogen sulfide and methyl mercaptan. Furthermore, Non-Patent Document 1 has problems because it is time-consuming since measurement is based on an attenuated total reflection (ATR) method. That measurement results are unreliable due to a significant influence of humidity.

Moreover, an analysis of an oral gas, which is one of the gases subject to detection, has problems in that measurement is time-consuming since only a small amount of the oral gas can be collected, and the oral gas contains numerous types of gases. In particular, there is a problem that an oral gas resulting from a periodontal disease is difficult to measure accurately since the oral gas varies significantly from person to person and only a minute amount of the oral gas can be collected.

CITATION LIST

Non-Patent Document

Non-Patent Document 1: Julio Rodriguez-Fernandez, Rosario Pereiro, Alfredo Sanz-Medel "Optical fiber sensor for hydrogen sulfide monitoring in mouth air" Analytica Chimica Acta, 2002, 471.1:13-23

Patent Document

Patent Document 1: Japanese Patent No. 5219033
Patent Document 2: Japanese Patent No. 5388309

DISCLOSURE OF THE INVENTION

Problems to be Solved by the Invention

Therefore, the object of the present invention is to provide an optical detection chip that can accurately measure hydrogen sulfide and methyl mercaptan contained in a gas subject to detection in a short time. Furthermore, another object of the invention is to provide an optical detection system, including an optical detection chip configured to separate an ammonia gas and phenol from a gas subject to detection and measure amounts of hydrogen sulfide and methyl mercaptan.

Means for Solving the Problems

Features of the invention, which are means to solve the above problems, will be described below.

(1) An optical detection chip including: a translucent substrate; and a layer structure formed on the translucent substrate and including a dye layer, the dye layer including an organic dye molecule including an amino group, a ketone group, or a quinone, and any one or two metal ions selected from the group consisting of Mn, Fe, Co, Ni, Cu, Zn, Cd, Hg, Ag, Pb and Tl, and the dye layer capable of changing color by reacting with a gas subject to detection including at least one of hydrogen sulfide or methyl mercaptan.

(2) The optical detection chip according to (1), in which the organic dye molecule is 2,6-dichloroindophenol, methylene blue, bromothymol blue, methyl red, or neutral red.

(3) The optical detection chip according to (1) or (2), in which the translucent substrate is an acrylic resin (PMMA), a styrene resin (PS), a polyethylene terephthalate resin (PET), a polycarbonate resin (PC), a polypropylene resin (PP), or glass.

(4) The optical detection chip according to (1), (2), or (3), in which the layer structure includes a particle layer formed of charged particles having an average particle diameter of 10 to 100 nm between the translucent substrate and the dye layer.

(5) The optical detection chip according to (4), in which the charged particles include at least one type of inorganic particles selected from the group consisting of titania, silica, and alumina, or at least one type of resin particles selected from the group consisting of an acrylic resin, a styrene resin, a fluororesin, and a silicone resin.

(6) The optical detection chip according to (4) or (5), in which the layer structure further includes an organic compound layer formed of an organic compound.

(7) The optical detection chip according to (6), in which the organic compound layer is formed of at least one cationic organic compound selected from the group consisting of polyethyleneimine, polyallylamine hydrochloride, polydiallyldimethylammonium chloride, chitosan, polyvinyl pyridine, and polylysine, or at least one anionic organic compound selected from the group consisting of polystyrene sulfonic acid, polyvinyl sulfuric acid, dextran sulfuric acid, chondroitin sulfuric acid, polyacrylic acid, polymethacrylic acid, polymaleic acid, and polyfumaric acid.

(8) The optical detection chip according to any one of (1) to (7), in which the optical detection chip is made of a flat plate material having a curved surface portion that reflects light beams entering the translucent substrate, and the layer structure is formed on the curved surface portion.

(9) The optical detection chip according to any one of (1) to (8) for use in the detection of hydrogen sulfide or methyl mercaptan included in the gas subject to detection.

(10) An optical detection system for measuring a concentration of a gas subject to detection including at least one of hydrogen sulfide or methyl mercaptan, the system including:

a dehumidifying filter configured to remove moisture from outside air to be introduced to produce dry gas;

a sealed container configured to enclose the gas subject to detection that has been collected; a pusher block and a motor configured to transport the gas subject to detection from the sealed container;

electromagnetic valves configured to switch a first passage to a second passage; and first and second optical detection devices each including a light-emitting diode (LED) and a photodiode (PD). In the first passage, the gas subject to detection is passed through a first filter configured to remove ammonia and phenol, and the resulting gas subject to detection is transported so as to be in contact with a curved surface portion of a first optical detection chip and in the second passage, the gas subject to detection is passed through a second filter to remove ammonia, phenol, and hydrogen sulfide, and the resulting gas subject to detection is transported so as to be in contact with a curved surface portion of a second optical detection chip.

(11) The optical detection system according to (10), in which the first and second optical detection chips are the optical detection chips according to any one of (1) to (9).

(12) The optical detection system according to (10) or (11), in which the optical detection device is configured to measure a change in the color of the layer structure.

(13) The optical detection system according to any one of (10) to (12), in which the first filter includes calcium acetate and the second filter includes calcium acetate and zinc sulfate.

Effects of the Invention

The present invention, which is a means to solve the above problems, exerts specific effects as a described below. The present invention can provide an optical detection chip that accurately detects amounts of hydrogen sulfide and methyl mercaptan in a short time. Furthermore, the present invention can provide an optical detection system, including an optical detection chip that accurately detects amounts of hydrogen sulfide and methyl mercaptan in a short time.

BRIEF DESCRIPTION OF THE DRAWINGS

FIG. 3 (b) depicts graphs showing a change in absorbance of a mixed liquid of DCIP and an Ag ion before and after exposure to a sulfur-containing gas;

PREFERRED MODE FOR CARRYING OUT THE INVENTION

Embodiments of the present invention will now be described. The following description is one exemplary embodiment of the present invention and does not limit the scope of the present invention. Note that, a metal element will be hereinafter described using a symbol.

1. Material and Configuration of Optical Detection Chip

The present invention relates to an optical detection chip including: a translucent substrate; and a layer structure formed on the translucent substrate and including a dye layer, the dye layer including an organic dye molecule that contains an amino group, a ketone group, or a quinone, for example, DCIP $(C_{16}H_6Cl_2NaO_2)$, methylene blue $(C_{16}H_{18}N_3SCl)$, bromothymol blue $(C_{27}H_{28}Br_2O_5S)$, methyl red $(C_{15}H_{15}N_3O_2)$, or neutral red $(C_{15}H_{17}ClN_4)$, and at least one metal ion selected from the group consisting of Mn, Fe, Co, Ni, Cu, Zn, Cd, Hg, Ag, Pb and Tl, and the dye layer capable of changing color by reacting with a gas subject to detection containing at least one of hydrogen sulfide ($H_2S$) or methyl mercaptan ($CH_3SH$).

First Embodiment

Figure 1:
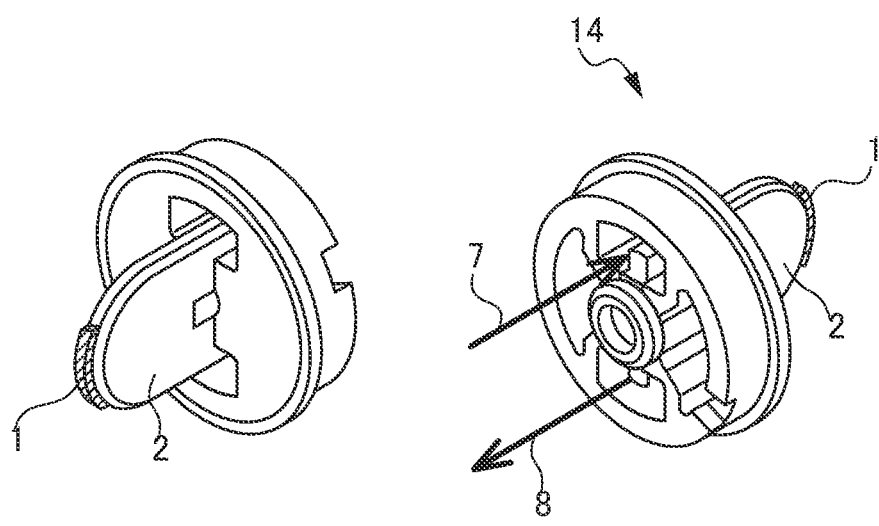
FIG. 1 shows appearance of an optical detection chip of the present invention.

FIG. 1 shows the appearance of an optical detection chip of the present invention. As shown in FIG. 1, an optical detection chip 14 includes a layer structure 1 on a translucent substrate 2. Hereinafter, the optical detection chip 14 will be described with reference to FIG. 1.

Translucent Substrate

As shown in FIG. 1, the optical detection chip 14 of the present invention is a thin flat plate translucent substrate 2 and an end made of a resin of the translucent substrate forms a curved surface portion. The layer structure 1, of which color changes when brought into contact with a gas subject to detection is deposited at the curved surface portion of the translucent substrate 2. This curved surface portion allows some of incoming beams 7 to be absorbed into a dye layer and decayed into outgoing beams 8 at a curved surface portion of a flat plate material, causing an intensity difference between the incoming beams 7 and the outgoing beams 8 and a color change.

Material of Translucent Substrate

The translucent substrate 2 is highly translucent and desirably has a high refractive index in order to prevent light loss at a bend portion. Specifically, the translucent substrate may be an acrylic resin, a styrene resin, a polyethylene terephthalate resin, a polycarbonate resin, or a polypropylene resin. Alternatively, glass, a translucent inorganic material, may also be used. Table 1 below shows the refractive indices of materials. Note that, the translucent substrate 2 preferably has an insulating property since a charge may be imparted. The glass is a generic term including, for example, heat-resistant tempered glass and quartz glass, and contains a silicate compound (silicate mineral) as a main component, an oxide of boric acid or phosphoric acid, and the like. The translucent substrate 2 of the optical detection chip 14 of the present invention is preferably an acrylic resin that is highly translucent and has a low refractive index.

TABLE 1

| Name of material | Refractive index |
|---|---|
| Glass | 1.44 |
| PMMA | 1.49 |
| PC | 1.59 |
| PET | 1.57 |
| PS | 1.59 |
| PP | 1.48 |

Shape of Translucent Substrate

The translucent substrate 2 of the optical detection chip 14 is a flat plate member and has a curved surface portion on a portion of an end. The size of the translucent substrate 2 is not particularly limited, but may be 0.1 to 2.0 mm in thickness, 2.5 to 10 mm in width, and 2.5 to 10 mm in length.

To date, an optical fiber has typically been used as an optical detection sensor. However, since the optical fiber has been originally used for data communication, sensitivity improvement is required when used for a detection sensor. Therefore, the optical detection chip 14 of the present invention includes a curved surface portion on a plate member rather than a fiber. The optical detection chip 14 of the present invention has comparable performance to an optical fiber bent into a U shape and has excellent reproducibility since it is a molded product produced with a mold. Furthermore, the optical detection chip 14 of the present invention, produced as a molded product, can be easily attached to and detached from an analyzer. Moreover, the optical detection chip 14 of the present invention has additional advantages of having reduced variation in the amount of light for analysis in an analyzer and getting a high evaluation for attachment to a device or a jig.

Layer Structure

Figure 2:
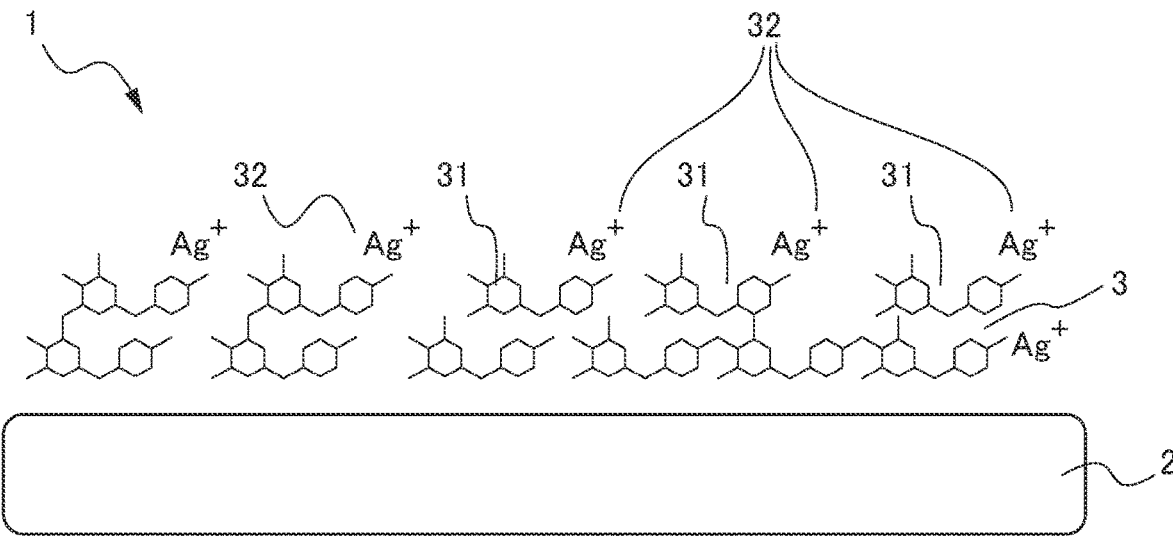
FIG. 2 is a diagram showing a configuration of a layer structure included in an optical detection chip according to one embodiment of the present invention.

FIG. 2 is a diagram showing a configuration of a layer structure included in an optical detection chip according to one embodiment of the present invention. As shown in FIG. 2, the layer structure 1 of the present invention is deposited with a dye layer 3 that includes an organic dye molecule 31 containing an amino group, a ketone group, or a quinone, and an Ag ion 32 on the translucent substrate 2.

Color Change

Figure 3:
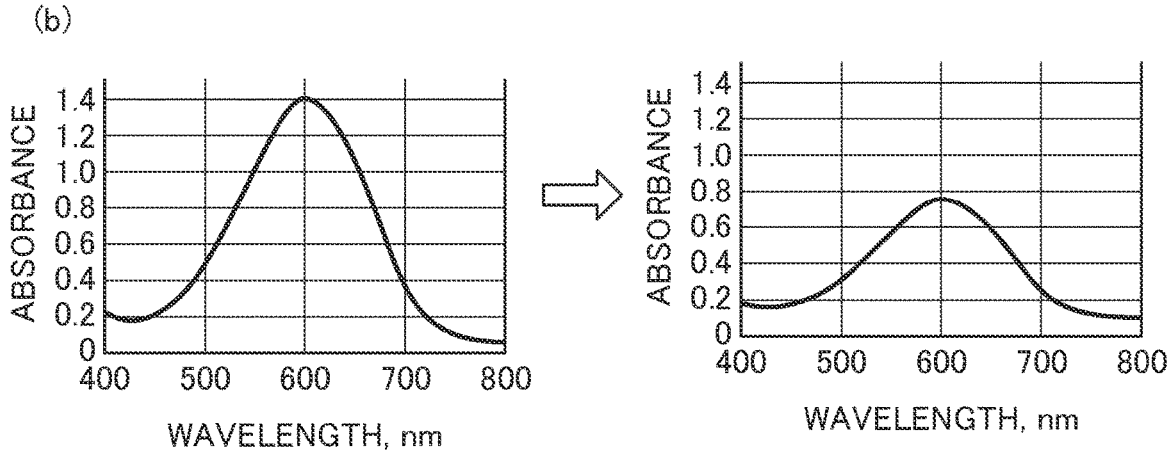
FIG. 3 (a) is a diagram showing a reaction of an organic dye molecule having a metal ion with a sulfur compound.

FIG. 3 (a) is a diagram showing a reaction of an organic dye molecule having a metal ion with a sulfur compound and FIG. 3 (b) depicts graphs showing a change in absorbance of an organic dye molecule. Measurement is made with a UV-Vis-IR spectrophotometer. A change in color resulting from a reaction of DCIP with a gas subject to detection will be described below. Although not shown in detail here, a Na ion in 2,6-dichloroindophenol sodium salt (DCIPNa) is ion-exchanged with an Ag ion in silver nitrate ($AgNO_3$) in an aqueous solution. When the gas subject to detection, including methyl mercaptan and hydrogen sulfide, is blown thereinto, silver sulfide ($Ag_2S$) is produced, and an H ion is produced in the proximity of a DCIP ion (Step 1). A ketone group or an amino group in the DCIP is highly reactive with an H ion and the H ion is produced in the proximity of DCIP, causing nucleophilic attack (Step 2). As a result, the amino group is in a highly electrophilic two-electron-deficient state. The deficient electron is donated by sulfur (S) in silver sulfide. As a result, the DCIP ion is reduced, becoming colorless and decreasing the absorbance of a film (Step 3). Furthermore, as shown in FIG. 3 (b), it can be seen that absorbance in a visible light region of a mixed aqueous solution of DCIP and an Ag ion. is significantly decreased by blowing hydrogen sulfide. This demonstrates that the gas subject to detection, including hydrogen sulfide and methyl mercaptan, causes a color change of the mixed solution of DCIP and an Ag ion. The color change indicates the presence of hydrogen sulfide and methyl mercaptan.

Organic Dye Molecule

An organic dye molecule 31 in the present invention may be a compound that has a functional group such as an amino group, a ketone group, and a quinone, and that changes in color by reacting with a gas subject to detection such as hydrogen sulfide and methyl mercaptan. Specific examples of the organic dye molecule 31 include 3,7-diamino-5- phenylphenazine-5-ium chloride ($C_{18}H_{15}ClN_4$), 5,6-dimethyl-1,10-phenanthroline ($C_{14}H_{12}N_2$), Acid Blue 9 ($C_{37}H_{34}N_2Na_2O_9S_3$), 5-methyl-1,10-phenanthroline hydrate ($C_{13}H_{10}N_{2-x}H_2O$), 1,10-phenanthroline ($C_{12}H_8N_2$), 5-nitro-1,10-phenanthroline ($C_{12}H_7N_3O_2$), fluorescein isothiocyanate ($C_{21}H_{11}NO_5S$), eosin ($C_{20}H_8Br_4O_5$), Basic Violet ($C_{24}H_{28}ClN_3$), 2,2'-bipyridyl ($C_{10}H_8N_2$), N-phenylanthranilic acid ($C_{13}H_{11}NO_2$), a ferroin solution ($C_{36}H_{24}FeN_6O_4S$), viologen ($C_{32}H_{54}Cl_2N_2O_{10}$), 2,6-dichloroindophenol ($C_{16}H_6Cl_2NaO_2$: DCIP), 2,6-dichlorophenolindo-o-cresol sodium salt ($C_{13}H_8Cl_2NNaO_2$), 2,7-diamino-9-thionia-10-azaanthracene ($C_{12}H_{10}N_3S$), potassium indigotrisulfonate ($C_{16}H_7K_3N_2O_{11}S_3$), indigo carmine ($C_{16}H_8N_2Na_2O_5S_2$), neutral red ($C_{15}H_{17}ClN_4$), methylrosaniline chloride ($C_{25}H_{30}ClN_3$), thymol blue ($C_{27}H_{30}O_5S$), methyl yellow ($C_{14}H_{15}N_3$), bromophenol blue ($C_{19}H_{10}Br_4O_4S$), congo red ($C_{32}H_{22}N_6Na_2O_6S_2$), methyl orange ($C_{14}H_{14}N_3NaO_3S$), bromcresol green ($C_{21}H_{14}Br_4O_5S$), methylene blue ($C_{16}H_{18}ClN_3S$), methyl red ($C_{15}H_{15}N_3O_2$), methyl purple ($C_{14}H_{11}NO_3$), azolitmin ($C_{10}H_{11}N_3O$), bromcresol purple ($C_{21}H_{16}Br_2O_5S$), cresol red ($C_{21}H_{18}O_5S$), phenolphthalein ($C_{20}H_{14}O_4$), thymolphthalein ($C_{28}H_{30}O_4$), phenosafranine ($C_{18}H_{15}ClN_4$), indigotetrasulfonic acid ($C_{16}H_6N_2O_{14}S_{4.4}KH_2O$), bromothymol blue ($C_{27}H_{28}Br_2O_5S$), diphenylamine ($C_{12}H_{11}N$), diphenylbenzidine ($C_{24}H_{20}N_2$), diphenylamine sulfonic acid ($C_{12}H_{11}NO_3S$), 5,6-dimethylphenanthroline iron (II) (5,6-dimethylferroin) (($C_{14}H_5N_2$)$_3$Fe), Erioglaucine A ($C_{37}H_{34}N_2Na_2O_9S_3$), 5-methylphenanthroline iron (II) (5-methylferroin) ($C_{13}H_{10}N_2$), phenanthroline iron (II) (ferroin) ([Fe($C_{12}H_8N_2$)$_3$]SO$_4$), 5-nitrophenanthroline iron (II) (nitroferroin) ($C_{12}H_7N_3O_2$), or a salt thereof. Among them, DCIP, methylene blue, bromothymol blue, methyl red, or neutral red is particularly preferred. These organic dyes and functional groups easily undergo electron transfer due to their carbon ring structure and can be highly reactive with a proton due to the presence of an amino group, a ketone group, or a quinone.

Metal Ion

A metal ion 32 reactive with hydrogen sulfide and methyl mercaptan is desirably any one element selected from the group consisting of Mn, Fe, Co, Ni, Cu, Zn, Cd, Hg, Ag, Pb and Tl, but two or fewer elements may also be used in order to control a physical property. In this case, it is preferred to select two or less elements simultaneously, because the more elements there are, the more time is required to precisely adjust and control composition. In particular, Cu, Ag, or Hg is preferably selected. An aqueous solution in which the metal ion is dissolved in water in the form of a salt with an acid is applied to the organic dye molecule 31. Alternatively, the translucent substrate 2 deposited with the organic dye molecule 31 may be dipped in the aqueous solution. The acid may be hydrochloric acid, hydrogen bromide acid, sulfuric acid, nitric acid, sulfonic acid, or carboxylic acid such as acetic acid. Silver nitrate or copper nitrate is particularly preferably used. This is because it significantly changes in color and is readily detected.

Precipitation Index

The metal ion 32 is reacted with hydrogen sulfide or methyl mercaptan to produce a proton. This proton is nucleophilically reacted with an unpaired electron at N (nitrogen) in an amino group or O (oxygen) in a ketone group or a quinone to produce a carbocation eventually. As a result, the organic dye molecule 31 is reduced. Therefore, sulfide of the metal ion 32 having a lower precipitation index is more likely to produce sulfide. Then, as shown in Table 2, a precipitation index of metal sulfide is $1\times10^{-16}$ or less, preferably $1\times10^{-25}$ or less, and more preferably $1\times10^{-35}$ or less. Specifically, since copper sulfide (CuS), Ag$_2$S, or mercuric sulfide (HgS) is more preferred, a preferred metal is Cu, Ag, or Hg.

TABLE 2

| Name of compound | Precipitation index |
|---|---|
| MnS | $1 \times 10^{-16}$ |
| FeS | $4 \times 10^{-19}$ |
| CoS | $5 \times 10^{-22}$ |
| Tl$_2$S | $1 \times 10^{-22}$ |
| ZnS | $1 \times 10^{-24}$ |
| NiA | $1 \times 10^{-25}$ |
| CdS | $5 \times 10^{-27}$ |
| PbS | $3 \times 10^{-28}$ |
| CuS | $4 \times 10^{-38}$ |
| Ag$_2$S | $8 \times 10^{-51}$ |
| HgS | $3 \times 10^{-52}$ |

Arrangement of Metal Ion

DCIPNa, serving as the organic dye molecule 31, forms a layer on the translucent substrate 2. As shown in FIG. 2, DCIP forms two layers on the translucent substrate 2. This is due to a hydrophobic effect of a benzene ring. DCIP is folded at a nitrogen (N) atom, and another DCIP layer adsorbs thereon by the action of the benzene ring. DCIP in an outermost DCIP layer remains in the form of a sodium salt, and when it is dipped into a silver nitrate solution, a Na ion is ion-exchanged with an Ag ion to thereby adsorb on a layer. Thus, the Ag ion adsorbs as an outermost layer. Thus-adsorbed Ag ion efficiently causes a color change when brought into contact with the gas subject to detection.

Figure 4A:
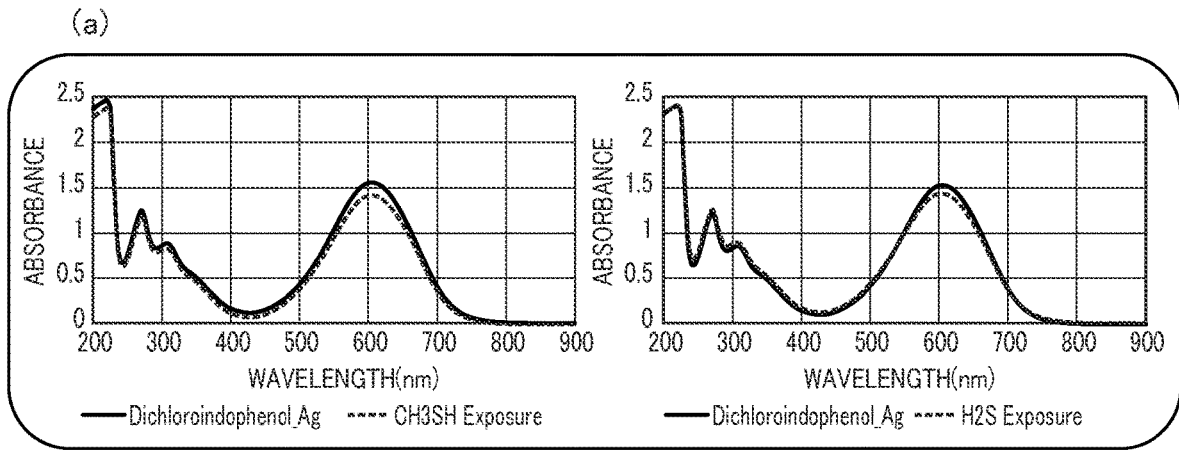
FIG. 4A depicts graphs showing changes in absorbance when methyl mercaptan (left panel) or hydrogen sulfide (right panel) as a sulfur-containing gas is blown into aqueous solutions including different organic dye molecules.
Figure 4A:
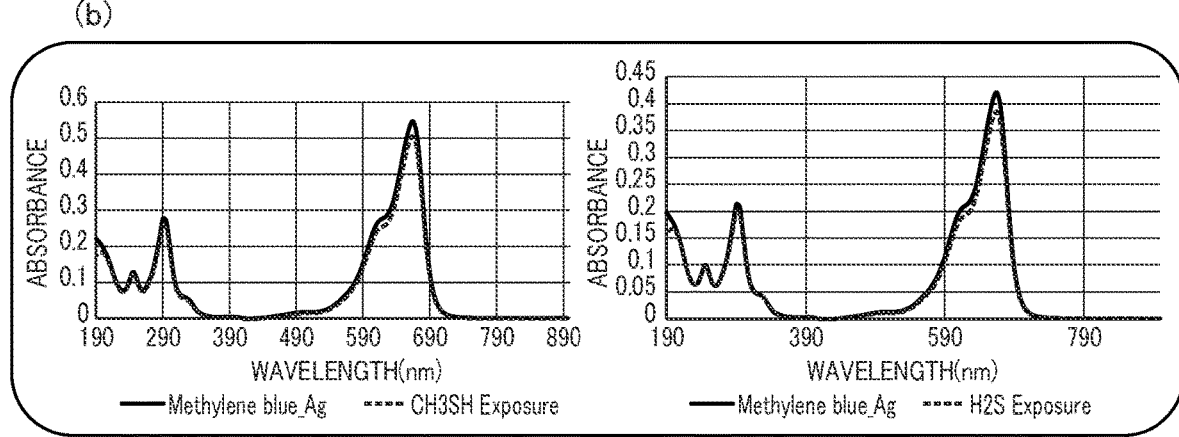
Figure 4A:
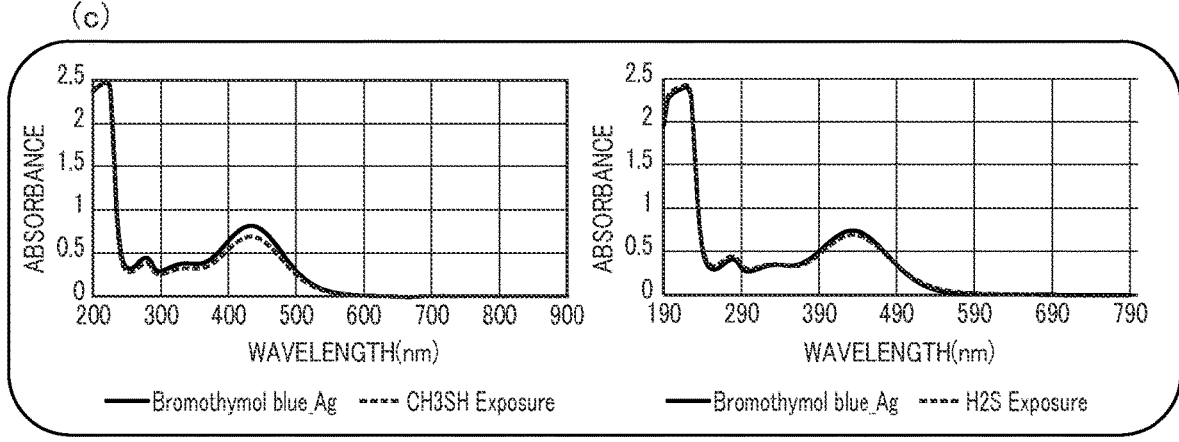
Figure 4B:
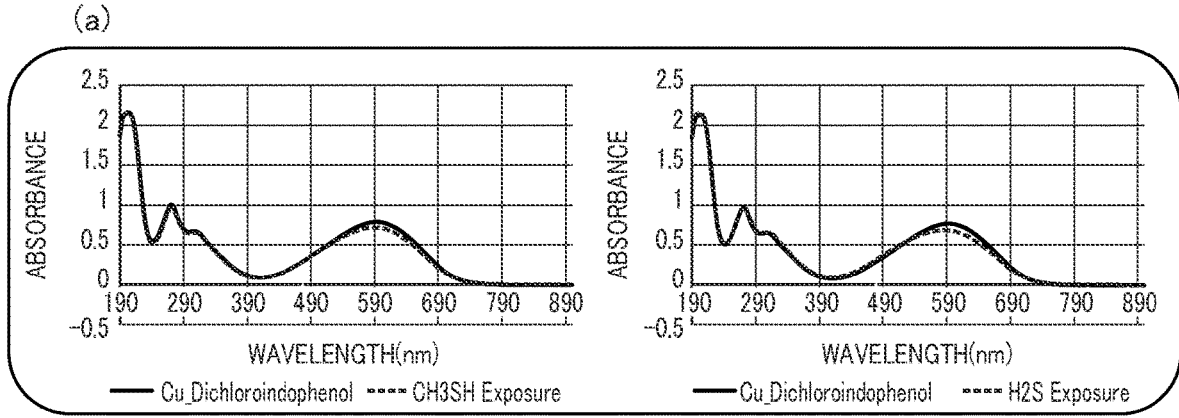
FIG. 4B depicts graphs showing changes in absorbance when methyl mercaptan (left panel) or hydrogen sulfide (right panel) as sulfur-containing gas is blown into aqueous solutions of DCIP including different metal ions.
Figure 4B:
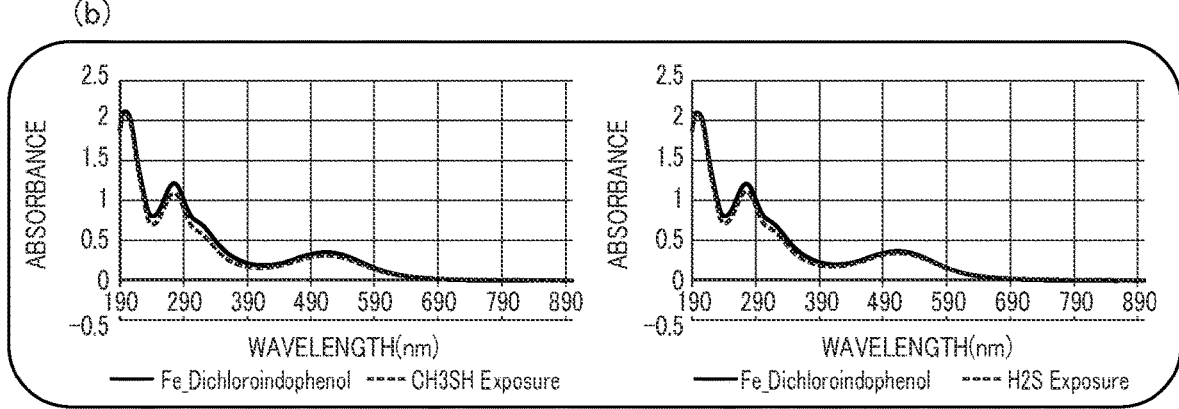

FIG. 4A depicts graphs showing changes in absorbance when methyl mercaptan (left panel) or hydrogen sulfide (right panel) as a sulfur-containing gas is blown into aqueous solutions, including different organic dye molecules. FIG. 4B depicts graphs showing changes in absorbance when methyl mercaptan (left panel) or hydrogen sulfide (right panel) as sulfur-containing gas is blown into aqueous solutions including different metal ions. FIG. 4A (a) shows a change in absorbance of methyl mercaptan or hydrogen sulfide in an aqueous solution containing an Ag ion serving as the metal ion and DCIP serving as the organic dye molecule. FIG. 4A (b) shows a change in absorbance of methyl mercaptan or hydrogen sulfide in an aqueous solution containing an Ag ion serving as the metal ion and methylene blue serving as the organic dye molecule. FIG. 4A (c) shows a change in absorbance of methyl mercaptan or hydrogen sulfide in an aqueous solution containing an Ag ion serving as the metal ion and bromothymol blue serving as the organic dye molecule. FIG. 4B (a) shows a change in absorbance of methyl mercaptan or hydrogen sulfide in an aqueous solution containing a Cu ion serving as the metal ion and DCIP serving as the organic dye molecule. FIG. 4B (b) shows a change in absorbance of methyl mercaptan or hydrogen sulfide in an aqueous solution containing a Fe ion serving as the metal ion and DCIP serving as the organic dye molecule. In any aqueous solution, methyl mercaptan or hydrogen sulfide changes absorbance. Furthermore, organic dye molecules or metal ions other than those described above also show a change in absorbance.

Second Embodiment

Figure 5:
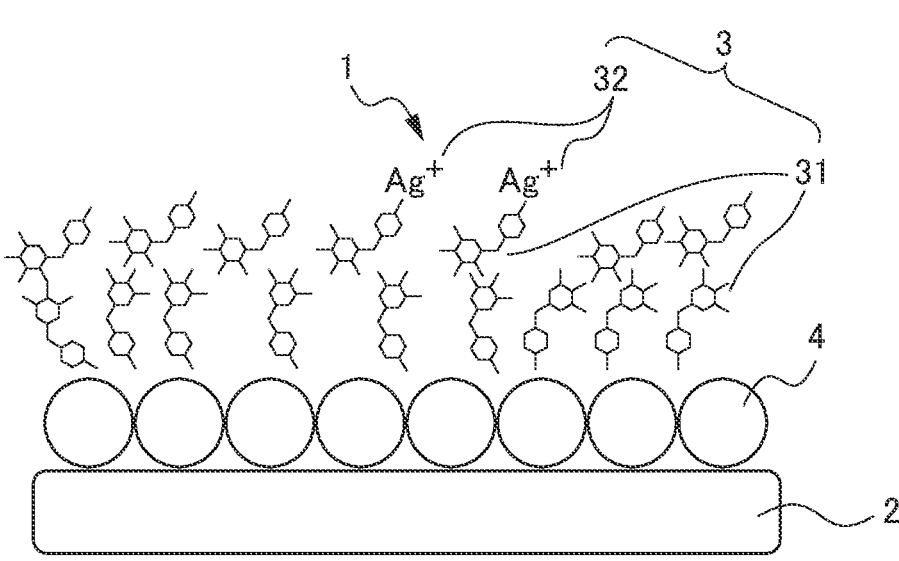
FIG. 5 is a diagram showing a configuration of a layer structure included in an optical detection chip according to another embodiment of the present invention.

FIG. 5 is a diagram showing a layer structure included in an optical detection chip according to another embodiment of the present invention. A layer structure 1 constituting an optical detection chip 14 of the present invention includes a particle layer 4 composed of charged particles having an average particle diameter of 10 to 100 nm and preferably 30 to 80 nm between a translucent substrate 2 and a dye layer 3 composed of an organic dye layer 31 and a metal ion 32. The particle layer 4 is formed of single-layered or multilayered particles. The multilayered particles increase the continuous space formed of the particle layer 4, increasing the chance for the gas subject to detection to enter the continuous space and contact with the metal ion 32. Thus, the optical detection chip 14 can have improved sensitivity.

Particle Layer

Particles in the particle layer 4 have an average particle diameter of 10 to 100 nm and preferably 30 to 80 nm. The particles having the average particle diameter form an appropriate-sized continuous gap between the particles in the particle layer 4, resulting in a layer structure 1 in which the gas subject to detection diffuses well and has excellent responsivity. When the average particle diameter is less than 30 nm, the gap formed between the particles gets smaller. This tends to reduce the diffusivity of the gas subject to detection. In particular, when the average particle diameter is less than 10 nm, the diffusivity of the gas subject to detection is significantly reduced. When the average particle diameter is more than 80 nm, the absorption rate of the particles onto the translucent substrate 2 or the dye layer 3 is reduced, making it difficult to produce a uniform particle layer 4. In particular, when the average particle diameter is more than 100 nm, the uniform particle layer 4 is more difficult to produce.

The particles may be inorganic particles or organic particles. Furthermore, the particles may be produced by a dry or wet process. The particles may be used without limitation as long as they carry a surface charge or can impart a charge on a surface. For example, inorganic particles such as an oxide, a carbide, or a nitride of titania, silica, alumina, etc. may be used. Furthermore, a natural resin and/or a synthetic resin, or a derivative thereof, may also be used. For the shape of the particles, particles formed into an almost spherical shape are suitably used. This is because they have excellent dispersibility and the size of a gap formed between particles in the particle layer 4 is easily controlled.

Furthermore, the surface charge of the particles is changed so as to electrostatically interact with a surface charge of the translucent substrate 2 (not shown) and thus the particles can be directly deposited on the translucent substrate 2. The charge may be anionic or cationic charge as long as it is opposite to that of a counterpart to which the particles are adsorbed. The surface charge of the particles is changed so as to electrostatically interact with a surface charge of the translucent substrate 2 and thus the particles can be directly deposited on the translucent substrate 2 via an organic compound layer 5. The particles are preferably silica. In addition, titania or alumina may also be combined therewith. A surface of silica may be coated with alumina. Furthermore, this allows surface polarity to be controlled since silica that is anionic is treated with alumina that is cationic.

Formation of Charge Layer

For the optical detection chip 14, a charge may be imparted to the translucent substrate 2. The charge may be an anion charge or a cation charge. A charge layer carrying the charge (not shown) allows the formation of a layer structure 1 that is rigid and stable for a long time from the translucent substrate 2 and the dye layer 3. The charge layer is not particularly limited but may be formed by a plasma treatment with a corona discharge. Furthermore, the charge may be adhered to by dipping into or coating with an anionic or cationic aqueous solution.

Formation of Particle Layer

The particle layer 4 may be formed by dipping a surface of the translucent substrate 2 that carries a charge opposite to that of the below-described organic compound layer 5 into a dispersion liquid of the particles. The dispersion liquid of the particles may be those in which the particles are dispersed in water, an organic solvent, or a mixed liquid of water and an organic solvent. Furthermore, a cationic sol treatment agent may be used for treating surfaces of the particles. If necessary, the pH of the dispersion liquid may be adjusted by adding hydrochloric acid, etc., or using a buffer in order to achieve the particles carrying a sufficient number of charges. A concentration of the dispersion liquid depends on the dispersibility of the particles, etc., but adsorption of the particles is based on neutralization and saturation of a charge in a counterpart to which they adsorb. Therefore, a precise concentration setting is not necessary. Typically, a concentration of 0.1 to 25 wt % is used but is not limited to this range.

Third Embodiment

Figure 6:
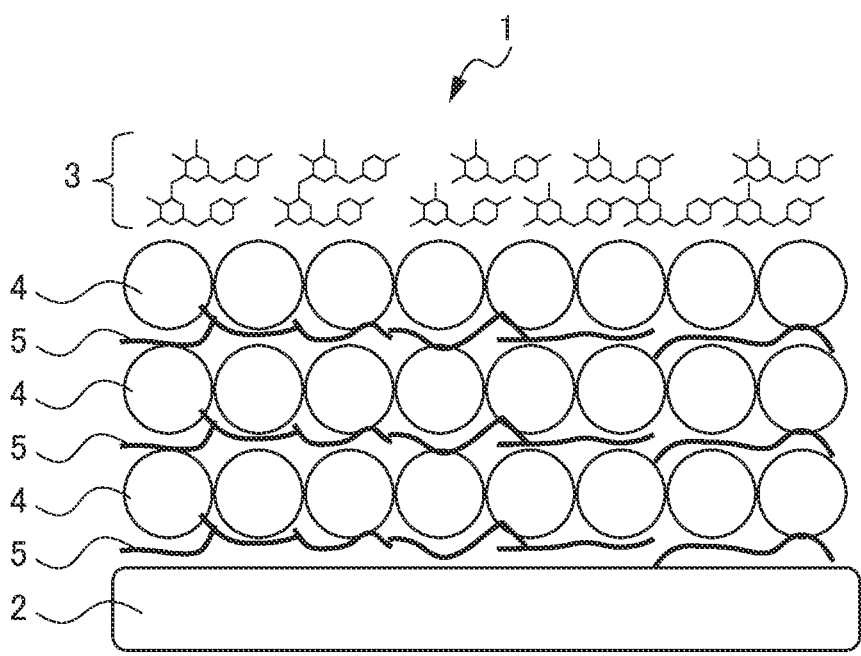
FIG. 6 is a diagram showing a configuration of a layer structure included in an optical detection chip according to another embodiment of the present invention.

FIG. 6 is a diagram showing a configuration of a layer structure included in an optical detection chip according to another embodiment of the present invention. A layer structure 1 includes a dye layer 3, a particle layer 4, and an organic compound layer 5 composed of an organic compound. As shown in FIG. 6, the organic compound layer 5 to which an organic compound is adsorbed, and the particle layer 4 composed of particles such as silica, are alternately laminated at least one by one between a translucent substrate 2, and the dye layer 3. The translucent substrate 2 may include a charge layer (not shown) thereon. The organic compound layer 5 may be deposited on the translucent substrate 2, and then the particle layer 4 may be deposited thereon. Alternatively, the particle layer 4 may be deposited on the translucent substrate 2 and then the organic compound layer 5 may be deposited thereon. Such an order may be selected depending on a charge carried by the dye layer 3 to be used. An outermost layer is preferably the particle layer 4, considering the diffusivity of the gas subject to detection. When a cationic dye is used, the particle layer 4 is preferably anionic since a greater amount of dye is introduced. In this case, the organic compound layer 5 is preferably cationic due to charge stability. Furthermore, since the translucent substrate 2 is often anionic, when a cationic dye is used, the organic compound layer 5 is preferred, and the particle layer 4 and the dye layer 3 are anionic.

An organic polymer having a charged functional group in a main or chain is used as the organic compound. At least one of those having a cationically-charged functional group such as a quaternary ammonium group; polyethyleneimine, polyallylamine hydrochloride, polydiallyldimethylammonium chloride, polyvinyl pyridine, polylysine, etc. may be used as a cationic organic compound, and these can be used alone or in a mixture thereof. At least one of those having a functional group that may be anionically charged, such as sulfonic acid, sulfuric acid, and carboxylic acid; polystyrene sulfonate, polyvinyl sulfate, dextran sulfate, chondroitin sulfate, polyacrylic acid, polymethacrylic acid, polymaleic acid, and polyfumaric acid, etc. may be used as an anionic organic compound and these can be used alone or in a mixture thereof. Furthermore, a conductive or functional polymer such as polyaniline-N-propanesulfonic acid can also be used. An organic compound carrying a charge opposite to that of the particle layer 3 or the translucent substrate 2 may be used to adsorb the organic compound onto the particle layer 3 or the translucent substrate 2 to thereby form the organic compound layer 5.

Application to Periodontal Disease

A large number of substances are produced in the oral cavity not only as a result of a periodontal disease but also from the digestive system such as the gastrointestinal tract and the respiratory system such as the lung due to vital activities and metabolism. In particular, hydrogen sulfide, methyl mercaptan, dimethyl sulfide ($(CH_3)_2S$), ethyl alcohol ($C_2H_{50}H$), trimethyl amine ($(CH_3)_3N$), acetone ($(CH_3)_2O$), phenol($C_6H_5OH$, etc.), etc. are included. Furthermore, a gas in the air such as oxygen or carbon dioxide and particles such as pollens are also included. Among them, it has been found that a large amount of hydrogen sulfide and methyl mercaptan are produced as a result of periodontal disease (reference: YAEGAKI, K.; SANADA, K. Volatile sulfur compounds in mouth air from clinically healthy subjects and patients with periodontal disease. Journal of periodontal research, 1992, 27.4: 233-238.). Therefore, it is suggested that an optical detection chip 14 of the present invention easily detects periodontal disease by selectively measuring hydrogen sulfide or methyl mercaptan. Note that, the term phenol, as used herein, refers to a compound having a hydroxy group (—OH) on an aromatic substituent, and one example thereof includes phenol ($C_6H_{50}H$).

2. Method for Producing Optical Detection Chip

A method for producing an optical detection chip 14 of the present invention, including a dye layer 3, a particle layer 4, and an organic compound layer 5 as a layer structure 1 on a translucent substrate 2 will be described.

Method for Producing First Embodiment

Figure 7:
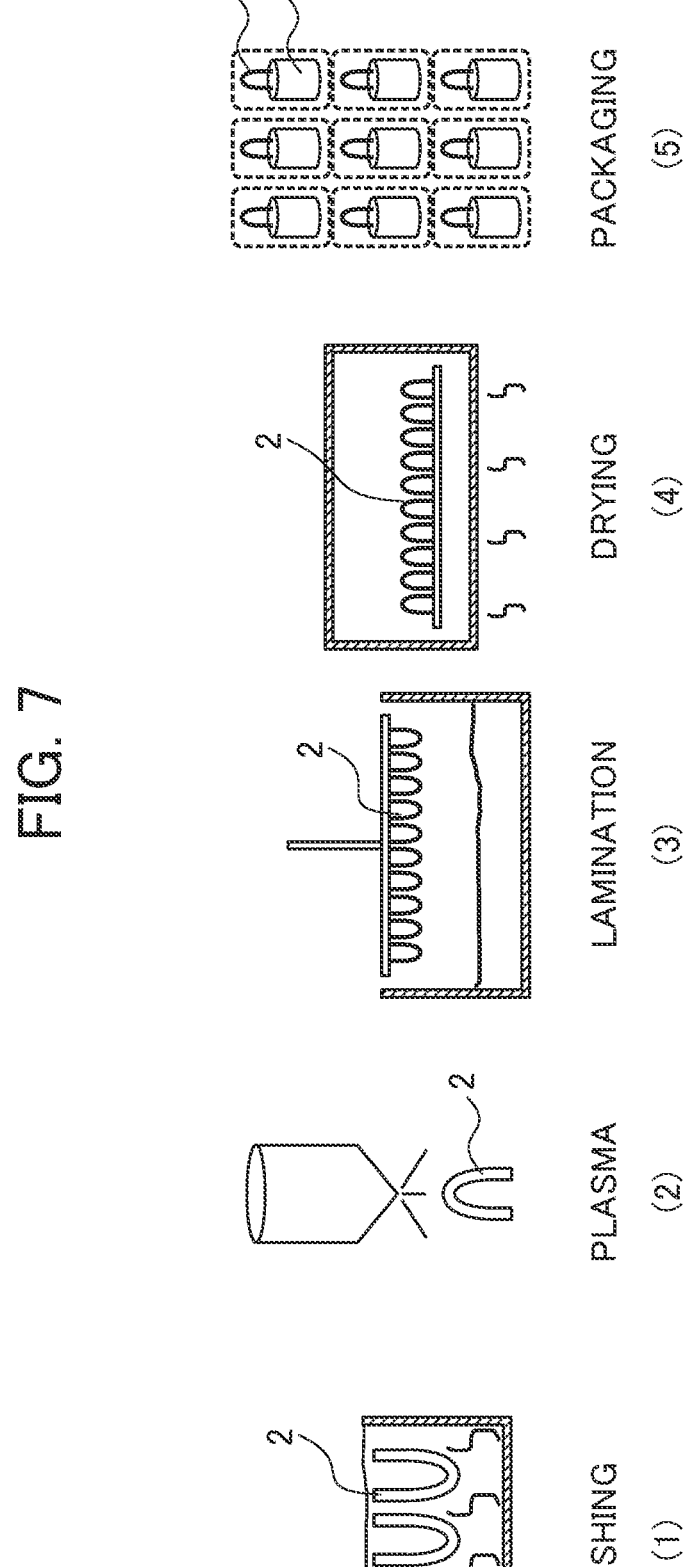
FIG. 7 is a schematic diagram describing a process for manufacturing an optical detection chip of the present invention.

FIG. 7 is a schematic diagram describing a process for manufacturing an optical detection chip of the present invention. A method for producing an optical detection chip 14, including a dye layer 3 as a layer structure 1 will be described. First, a receiving step 1, in which a translucent substrate 2 for the optical detection chip 14 is received and checked for appearance so as to prevent those with a scratch, etc. to be sent to the subsequent steps, is performed. Next, as shown in FIG. 7 (1), a washing step 2 in which the translucent substrate 2 is washed with distilled water, pure water, or ultrapure water with sonication is performed. This removes a contaminant on a surface on which a film is formed (film-formed surface) to prevent a defective product. Moreover, a post-washing test step 3 is used, in which the film-formed surface after washing is observed with a microscope. This prevents defective molding or those with dirt from being sent to the subsequent steps.

Next, as shown in FIG. 7 (2), after washing and drying, a plasma treatment step 4, in which a charge is imparted to the translucent substrate 2 by a plasma treatment with a corona discharge, is performed. This makes the translucent substrate 2 hydrophilic by the action of plasma. This plasma treatment is not necessary, but if performed, a stable and rigid layer may be formed due to the hydrophilicity of the translucent substrate 2 when the below-described organic dye component layer 31 or particle layer 4 is formed.

Next, a cassette transferring step 5, in which a plurality of the translucent substrates 2 are mounted on a film-forming cassette, is performed. This film-forming cassette is mounted on a film-forming device to thereby form films on the plurality of the translucent substrate 2. Next, as shown in FIG. 7 (3), a cassette setting step 6, in which the cassette is set on the film-forming device, is performed. Next, a film formation step 7 in which the cassette is dipped in a solvent in which an organic dye component is dissolved to thereby form an organic dye component layer 31 on the translucent substrate 2 and then dipped in a solvent in which metal ion is dissolved to thereby introduce a metal ion 32 on the organic dye component layer 31 is performed.

Next, a cassette removal step 8 in which the cassette containing the translucent substrate 2 on which a film has been formed is removed from the film-forming device is performed. Next, as shown in FIG. 7 (4), a drying step 9 in which a solvent is dried off in an oven.

Thereafter, a film-formed surface test step 10 in which the film-formed surface on the translucent substrate 2 is observed by a microscope and tested for any defect on the film-formed surface is performed. In the film-formed surface test step 10, the translucent substrate 2 with any defect observed on the film-formed surface is discarded. Thereafter, an assembly step 11, in which the translucent substrate 2 is removed from the cassette and capped in order to protect the film-formed surface, is performed. Thereafter, as shown in FIG. 7 (5), a packaging step 12 in which the thus-assembled optical detection chip 14 is packed in a packaging material such as an aluminum package is performed. The layer structure 1 in the optical detection chip 14 deteriorates by the action of oxygen or moisture in the air due to the presence of the metal ion 32 on the surface of the optical detection chip. Therefore, the optical detection chip 14 should be packed immediately after assembly. Furthermore, the optical detection chip is desirably stored in a cool, dry, dark place.

Method for Producing Second Embodiment

A method for producing an optical detection chip 14 according to the second embodiment of the present invention will be described. The second optical detection chip 14, according to the second embodiment, includes a particle layer 4 on a translucent substrate 2. Particles in the particle layer 4 may have any polarity, that is, may be anionic or cationic. Alternatively, they may be inorganic particles or resin particles. However, the application of particles having a polarity opposite to that of the ion by a plasma process on the translucent substrate 2 allows for a stable and densely packed arrangement of a large number of particles and control of the density of the particles. The optical detection chip 14 is produced by forming an organic dye component layer 31 on the particle layer 4 and then introducing a metal ion 32 on an organic dye component layer 31.

Method for Producing Third Embodiment

A method for producing an optical detection chip 14 according to the third embodiment of the present invention will be described. In the present invention, an optical detection chip 14 including one or more organic compound layers 5 and one or more particle layers 4 between a charge layer and a dye layer 3, is produced.

The charge layer (not shown) is deposited directly on a transparent substrate 2 shown in FIG. 6 and then the organic compound layer 5 is deposited directly thereon. If the charge layer is anionic, the organic compound layer 5 should be cationic. An anionic or cationic organic compound is used as an organic compound. The organic compound layer 5 is formed by adsorbing an organic compound that carries a charge opposite to a surface charge of particles in the particle layer 3 or the translucent substrate 2 onto the particle layer 3 or the translucent substrate 2.

The optical detection chip 14 of the present invention includes the particle layer 4 over the organic compound layer 5. This particle layer 4 should be anionic as opposed to the organic compound layer 5 which is cationic and deposited directly therebelow. As the particle diameter of the particle layer 4 increases, layer structure 1 becomes thicker and farther away from the translucent substrate 2, resulting in reduced sensitivity. In order to prevent this, it is preferred to reduce the diameter of the particles.

When an anionic organic compound layer 5 is first deposited, the particle layer 4 deposited directly thereon should be cationic. This allows the particle layer 4 to be rigidly adhered to the organic compound layer 5. Moreover, the sensitivity of a color change to a less frequent reaction can be improved by increasing the number of layers and thus the number of reaction points. The dye layer 3 is deposited after the last particle layer 4 and thus an Ag ion 32 is placed uppermost. Lamination allows an increase of reaction points for the Ag ion 32 and thus a density of the reaction points. At least one or more organic compound layers 5 and at least one or more particle layers 4 are alternately laminated. Space is expanded to allow the gas subject to detection to be incorporated in a large amount, increasing the number of the reaction points and thus sensitivity.

Application of Optical Detection Chip

As described above, the optical detection chip 14 may be applied to various analyses. The analyses can identify a type or state of a substance by outgoing beams that are partially absorbed or attenuated after a spectrum having an appropriate wavelength enters a sample.

3. Configuration of Optical Detection System

Figure 8:
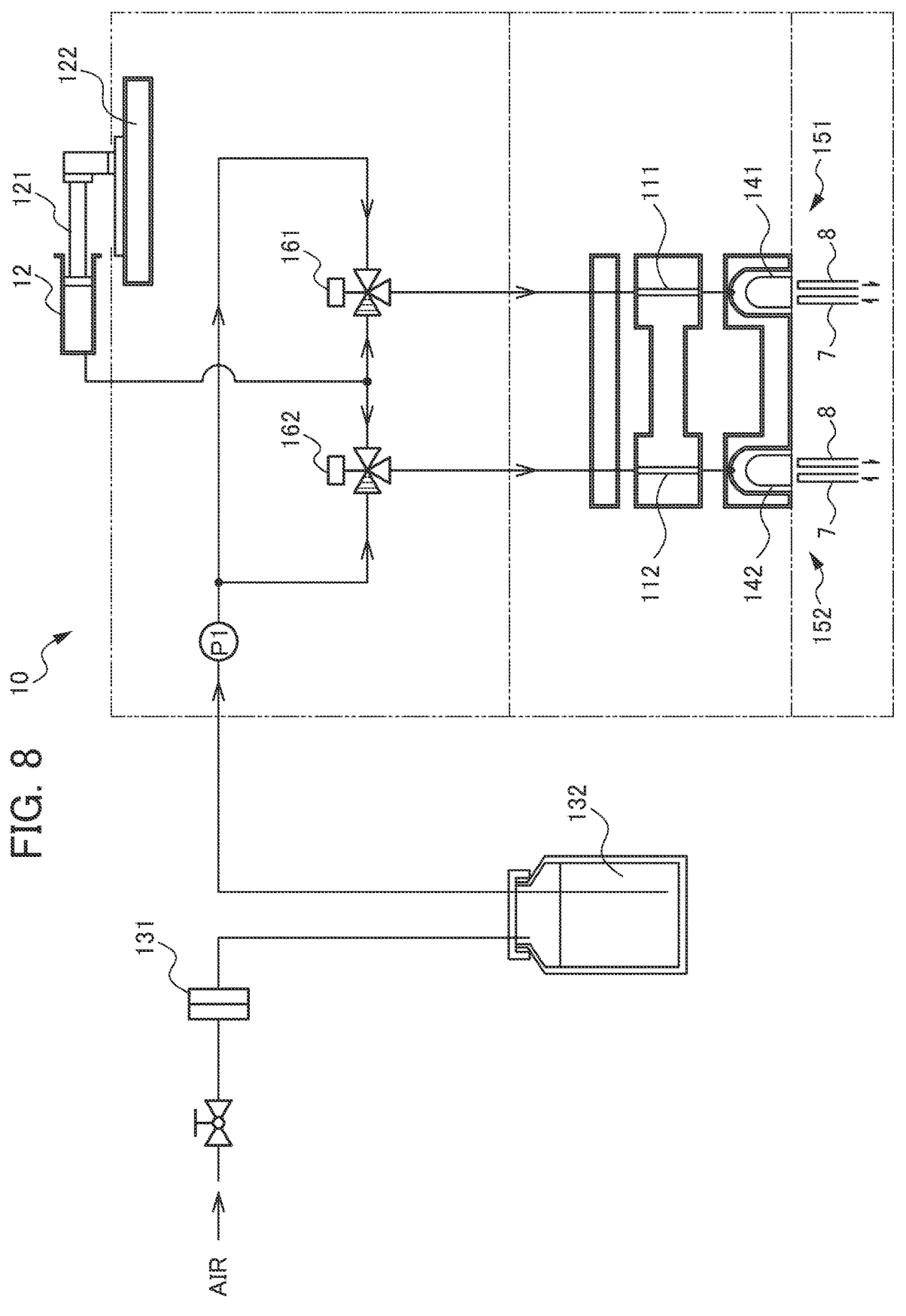
FIG. 8 is a schematic diagram showing a configuration of an optical detection system of the present invention.

FIG. 8 is a schematic diagram showing a configuration of an optical detection system of the present invention. An optical detection system 10 of the present invention is configured to measure concentrations of hydrogen sulfide and methyl mercaptan contained in a gas subject to detection, the optical detection system 10 including a dehumidifying filter 132 configured to remove moisture from outside air to be introduced to produce dry gas; a sealed container 12 configured to enclose the gas subject to detection that has been collected; a pusher block 121 and a motor 122 configured to transport the gas subject to detection from the sealed container 12; electromagnetic valves 161 and 162 configured to switch a first passage to a second passage; and first and second optical detection devices 151 and 152 each including a LED 171 and a PD 172. In the first passage, the gas subject to detection is passed through a first filter 111 to remove ammonia ($NH_4OH$), phenol ($C_6H_5OH$), etc., and hydrogen sulfide and methyl mercaptan that have passed through the first filter 111 are transported so as to be in contact with a layer structure 1 at a curved surface portion of a first optical detection chip 141 and in the second passage, the gas subject to detection is passed through a second filter 112 to remove ammonia, phenol, and hydrogen sulfide, and methyl mercaptan that has passed through the second filter 112 is transported so as to be in contact with a layer structure 1 at a curved surface portion of a second optical detection chip 142. In addition, a control system (not shown) configured to operate electronic components such as the electromagnetic valves 161 and 162 and a syringe motor 122; and a measurement system (not shown) configured to measure an LED 171 and a PD 172 in the first and second optical detection devices 151 and 152 to calculate a concentration, etc. are included. The optical detection system 10 will be described below in detail.

Production of Dry Air

The optical detection system 10 of the present invention is configured to open a pump to incorporate outside air and remove particles such as contaminants and pollens through a contaminant-removing filter 131. Thereafter, the air from which the particles have been removed is passed through a dehumidifying filter 132, including a desiccant to thereby remove moisture. Thus, dry air is produced. The dry air is pumped to the first and second electromagnetic valves 161 and 162 through a transport pipe.

Transportation of Gas Subject to Detection to Electromagnetic Valve

Next, the gas subject to detection is collected and transferred to the sealed container 12 in the optical detection system 10. The sealed container 12 is connected to a transport pipe and the gas subject to detection is pushed out with a pusher block 121 operated by the pusher block and transported to the electromagnetic valves 161 and 162 via the transport pipe. The syringe motor 122 is used to transport a precise amount of gaseous hydrogen sulfide and methyl mercaptan. A predetermined amount of the gas subject to detection is transported from the sealed container 12.

Transport to Filter

Figure 9:
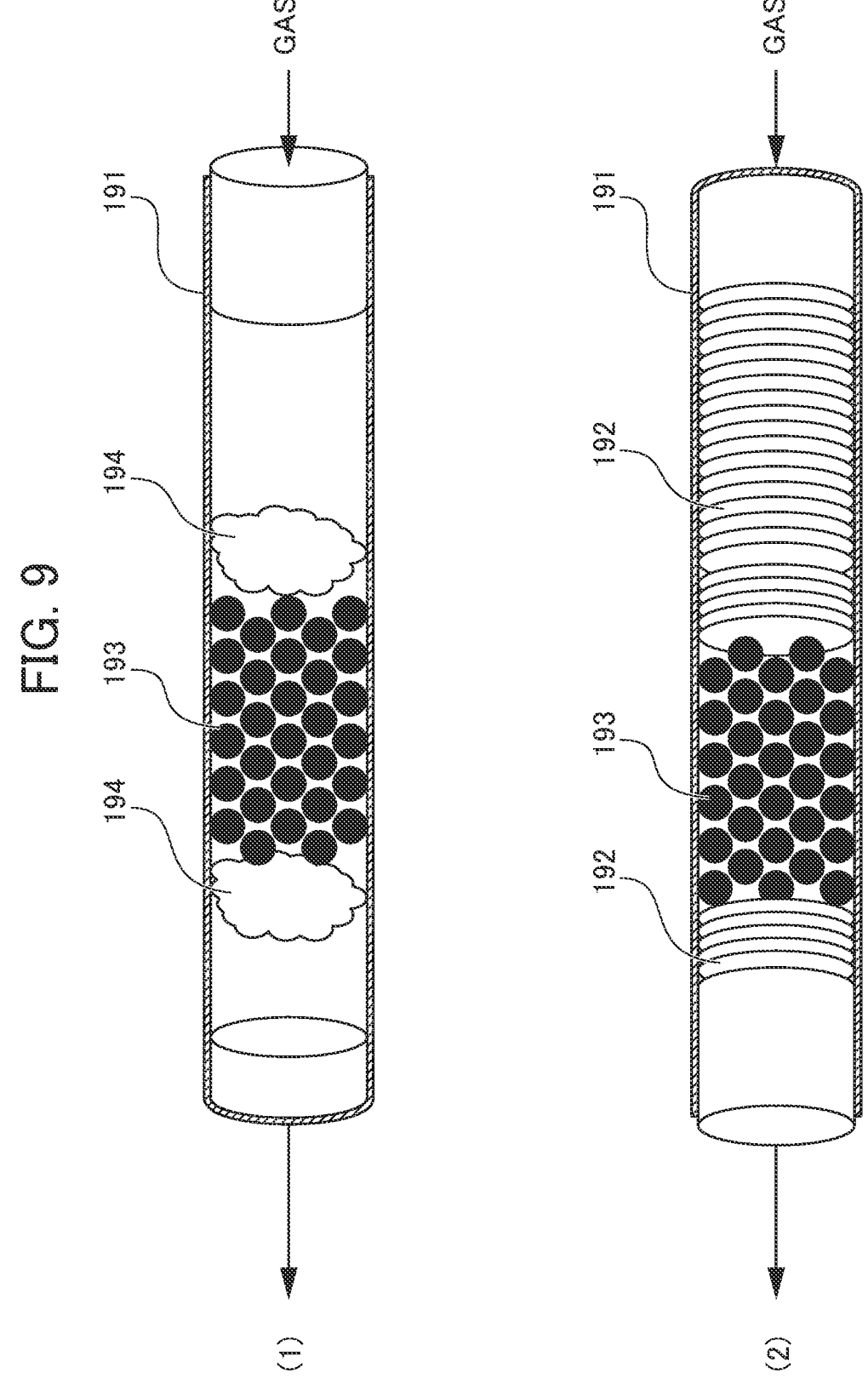
FIG. 9 is a schematic diagram showing configurations of filters.

The optical detection chip 14 is arranged in the optical detection system 1, and measurement is started. Next, the first and second electromagnetic valves 161 and 162 are opened, and a predetermined amount of the gas subject to detection is precisely transported to the first and second filters 111 and 112. FIG. 9 is a schematic diagram showing configurations of filters. The first filter 111 shown in FIG. 9 (1) includes a tetrafluoroethylene-perfluoroalkoxyethylene copolymer (PFA) resin tube 191 filled with calcium acetate (($CH_3COO)_2Ca$) powder 193 and silica wool 194 arranged to the front and rear of the powder. The second filter 112 shown in FIG. 9 (2) includes a PFA resin tube 191 filled with polypropylene(PP) nonwoven fabric 192 impregnated with zinc sulfate ($ZnSO_4$) and calcium acetate powder 193. Calcium acetate is weakly basic and can react with ammonia ($NH_4OH$), one of the unmeasured, undesired gas components in the gas subject to detection to be removed. Similarly, calcium acetate can remove phenol by complexing phenol with Ca in calcium acetate. Furthermore, zinc sulfate can remove hydrogen sulfide.

Measurement by Optical Detection Device

The dye layer 3 in the optical detection chip 14 changes in color by bringing the optical detection chip 14 into contact with the gas subject to detection. The first and second optical detection devices 151 and 152 can capture outgoing beams that have acquired information on the change in color of the layer structure 1 in the optical detection chip by directing incoming beams onto the dye layer 3 of the optical detection chip 14. For the incoming beams, the LED 171 is used as a light-emitting element, and the PD 172 is used as a light-receiving element. A wavelength of the LED 171 in the first and second optical detection devices 151 and 152 is not particularly limited, and a wavelength corresponding to an organic dye molecule may be used.

Figure 10:
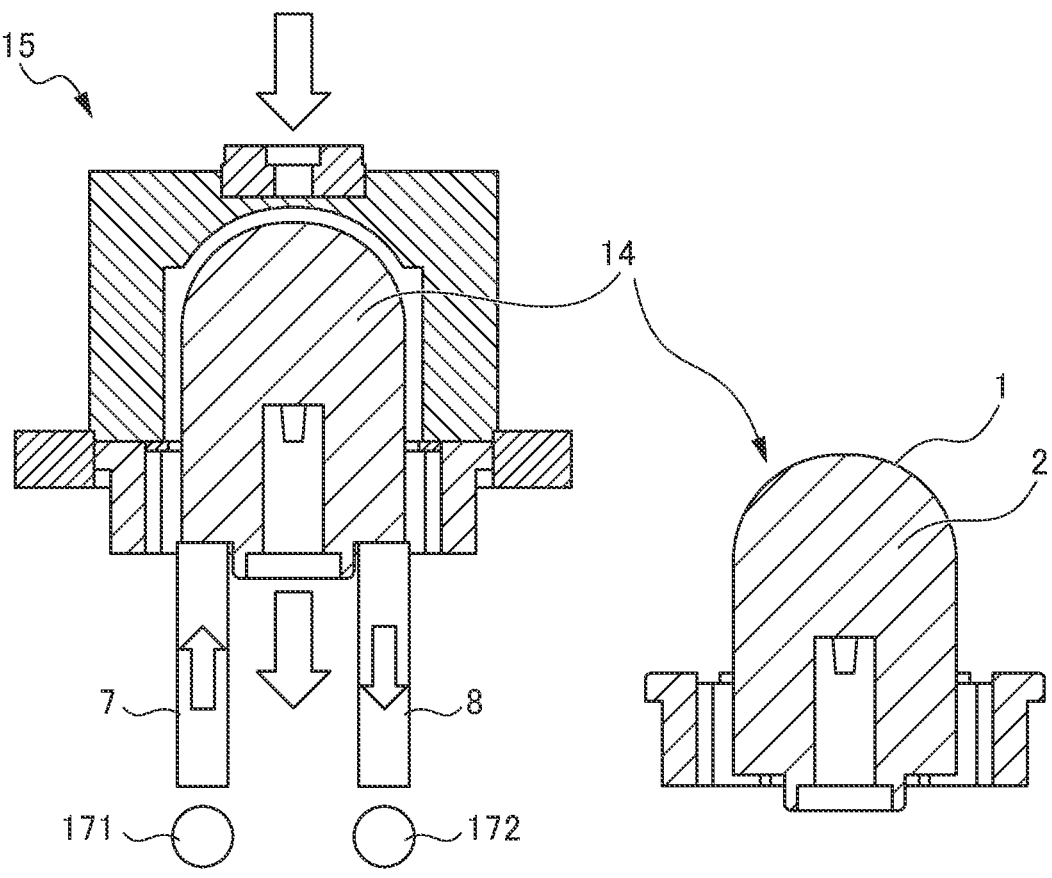
FIG. 10 is a diagram showing the positions of light beams entering and exiting an optical detection chip.

The optical detection system 10 of the present invention can reflect the structure of the thickness of a film by converting a wavelength to a length, allowing observation with resolution beyond diffraction-limited resolution due to wavelength. Since the translucent substrate 2 has a refractive index of more than 1.0, which is higher than that of air, incoming beams are reflected at the curved surface portion. FIG. 10 is a diagram showing the positions of light beams entering and exiting an optical detection chip. The optical detection chip 14 has a curved surface portion at an end in a longitudinal direction and a flat end at a lower portion opposite thereto. Incoming beams having a single wavelength emitted from the LED 171 enter through an optical fiber from the flat end of the optical detection tip 14 toward the curved surface portion. The incoming beams 7 acquire information on a change in color of the layer structure 1 at the curved surface portion of the optical detection tip 14 and exit from the flat end at the lower portion as outgoing beams 8, which can be captured at the PD 172 through an optical fiber. The incoming beams leak at the curved surface portion of the flat plate material and are absorbed in an organic dye molecule, and the beams are reflected as outgoing beams. Therefore, the change in color is detected from a change in intensity of the incoming beams.

Transport to Optical Detection Chip

Figure 11:
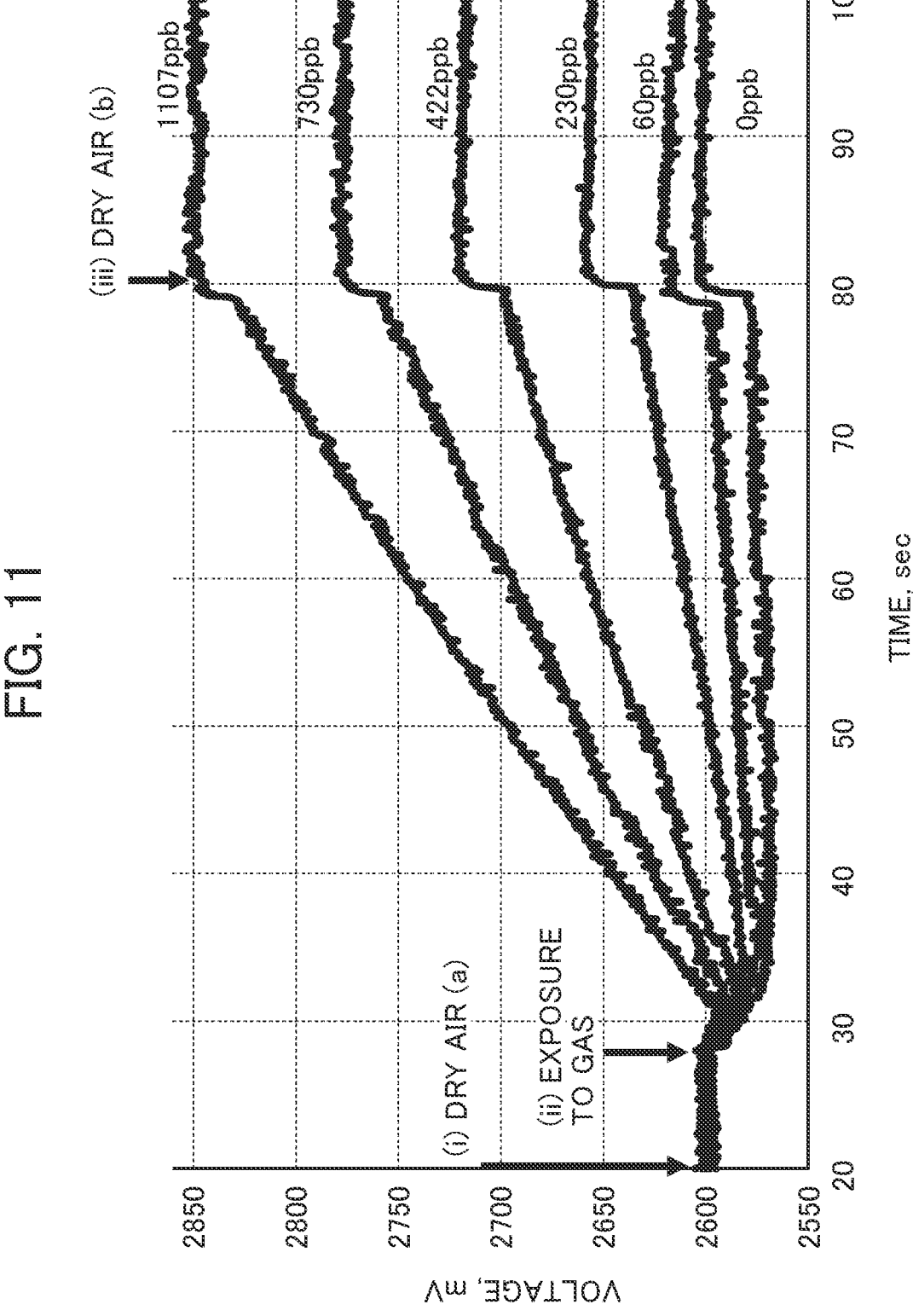
FIG. 11 is a graph showing measurement examples by an optical detection system of the present invention.

The optical detection chip 14 is set, the second optical detection chip 142 is placed under a dry air atmosphere, and a baseline is acquired ((i) dry air (a) portion in FIG. 11). At this time, the dry air should not be contacted with the first optical detection chip 141. After the baseline is acquired, the gas subject to detection is flowed from the second electromagnetic valve 162 through a second filter 112 into the second optical detection chip 142 to thereby bring them into contact ((ii) gas exposure section in FIG. 11). During this time, the dry air is transported through the first electromagnetic valve 161 to be brought into contact with the optical detection chip 141. At this time, the second electromagnetic valve 162 is closed in order to prevent the dry air from entering the second optical detection chip 142. After the gas subject to detection is exposed to the second optical detection chip 142, the second electromagnetic valve 162 was switched to allow the optical detection chip 141 to be exposed to the gas subject to detection transported from the first electromagnetic valve 161 through the first filter 111. During this time, the second optical detection chip 142 is exposed to the dry air to redetermine a baseline ((iii) dry air (b) portion in FIG. 11).

The first optical detection chip 141 is also exposed to the dry air after exposure to the gas subject to detection to thereby redetermine a baseline. A difference between baseline values before and after exposure was taken as an amount of change to calculate a concentration corresponding thereto. Since hydrogen sulfide has been removed at the second filter 112, the second optical detection device 152 gives an output resulting from a reaction of methyl mercaptan. Since hydrogen sulfide has not been removed in the first filter 111, the first optical detection device 151 gives an output resulting from a reaction of a mixed gas of methyl mercaptan and hydrogen sulfide.

Measurement of Hydrogen Sulfide and Methyl Mercaptan

Thus, the second optical detection device 152 gives the output resulting from a reaction with methyl mercaptan, and the first optical detection device 151 gives the output resulting from a reaction with a mixed gas of methyl mercaptan and hydrogen sulfide. Since an output only for methyl mercaptan is obtained from the second optical detection device 152, an output only for hydrogen sulfide can be obtained by subtracting the output of the second optical detection device 152 from the output of the first optical detection device 151. Each hydrogen sulfide and methyl mercaptan concentration is calculated from values from the first optical detection device 151 and the second optical detection device 152.

EXAMPLES

Examples of the present invention will be described. The present invention can include various embodiments and is not limited to the following Examples.

Experimental Example

A translucent substrate of an optical detection chip was made of an acrylic resin (manufactured by Asahi Kasei Corp.: DELPET 80N) flat plate having a thickness of 0.5 to 3 mm and formed so as to have a radius of a curved portion of 1.0 to 5.0 mm and surface roughness of 0.03 to 0.3 mm. The surface of the translucent substrate is dipped into distilled water and washed with ultrasonic cleaning. Next, the surface of the curved portion is subjected to a plasma treatment to impart a charge thereto from $O_3$. Next, the translucent substrate was dipped in an aqueous solution containing 20 to 25% of a cationic silica sol (average particle diameter: 45 nm, SNOWTEX ST-AK-L, manufactured by Nissan Chemical Corporation) for 10 min. This procedure formed a particle layer composed of silica. A film thickness per layer can be controlled by the concentration of the silica sol solution and the time for dipping. Next, the translucent substrate was washed with water, and then, dipped in 1 mmol/L of a DCIPNa (manufactured by KANTO CHEMICAL CO., INC.) aqueous solution to thereby form a single layer of an organic dye component layer on a surface of the particle layer. Next, the resultant was dipped in 1 mmol/L of an $AgNO_3$ (manufactured by KANTO CHEMICAL CO., INC.) aqueous solution for 10 min to adsorb an Ag ion onto the surface of the organic dye component layer. Thus, a dye layer was formed. The thus-produced optical detection chip was mounted in an optical detection device, and subjected to measurement of hydrogen sulfide and methyl mercaptan. All of the experiments below used this optical detection device.

The optical detection device was mounted on an optical detection system having the above-described configuration. Next, a gas subject to detection was collected according to the below-described order.

(1) Hold a straw between the lips and close the lips tightly.
    (2) Wait for 30 seconds in that state and accumulate for 30 seconds a gas subject to detection. During this time, a subject should breathe through the nose and not open the mouth.

(3) Slowly pull a plunger for a syringe to collect 10 mL of the gas subject to detection in the syringe.

(4) Start measurement immediately after collection.

FIG. 11 is a graph showing measurement examples of the present invention by an optical detection system. First, dry air is flowed for a certain period of time and supplied to an optical detection device. Thus, moisture is removed by drying from a layer structure of a curved section on the surface of the optical detection tip. At this time, the absorbance of the layer structure before measurement was measured. A voltage at this time was determined as a measurement voltage (a). Then, a gas subject to detection was fed from a sealed container, and an electromagnetic valve was opened to bring the optical detection device into contact with the gas subject to detection. Next, light beams having a single wavelength of 670 nm from an LED that was on all the time were reflected back from the optical detection device. At this time, the incoming beams capture a change in color in a dye layer of the layer structure, and a PD measures the change as a voltage. Then, dry air flowed. A voltage at this time was determined as a measurement voltage (b). Concentrations of hydrogen sulfide and methyl mercaptan included in the gas were calculated from a difference between the measurement voltage (a) and the measurement voltage (b).

As shown in FIG. 11, firstly, a certain voltage was decreased since the humidity of the optical detection chip changed, resulting from contact with the gas subject to detection. However, after the gas subject to detection flowed, a reaction took place, resulting in increasing a measurement voltage. This increase in voltage is proportional to concentrations of hydrogen sulfide and methyl mercaptan. As shown in FIG. 11, the measurement voltage varies depending on an increment in the amount of methyl mercaptan. Furthermore, similar results are obtained for hydrogen sulfide.

Figure 12:
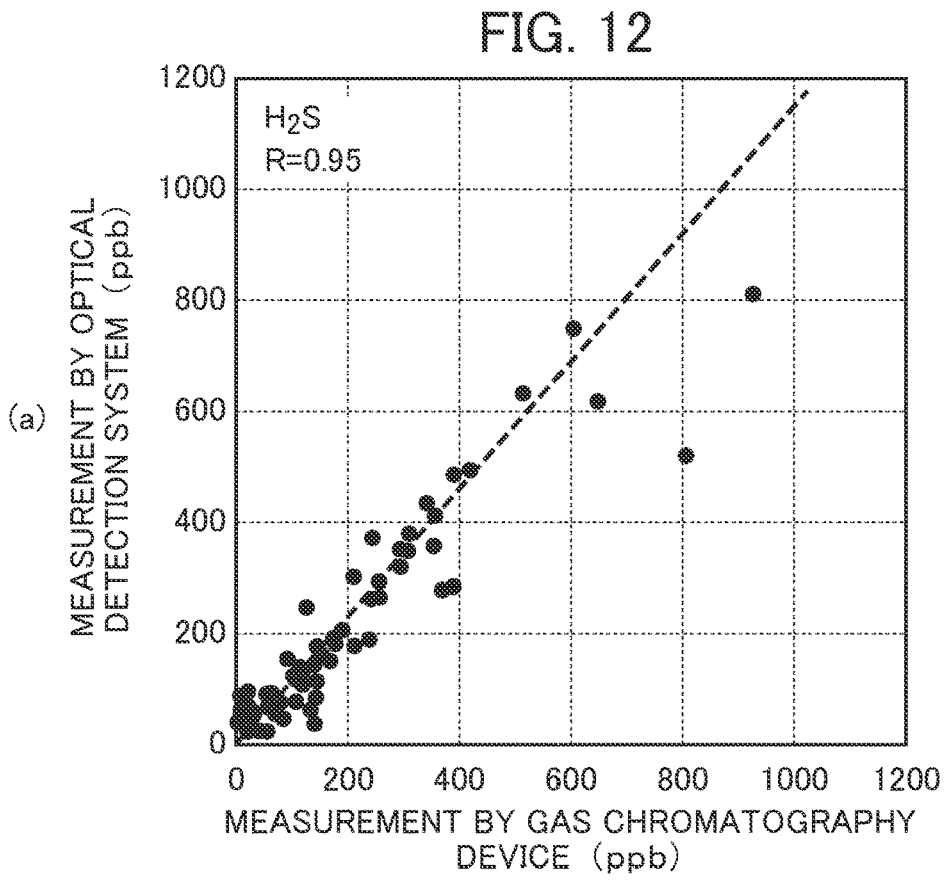
FIG. 12 depicts graphs showing a comparison of an optical detection system of the present invention to another measurement device.
Figure 12:
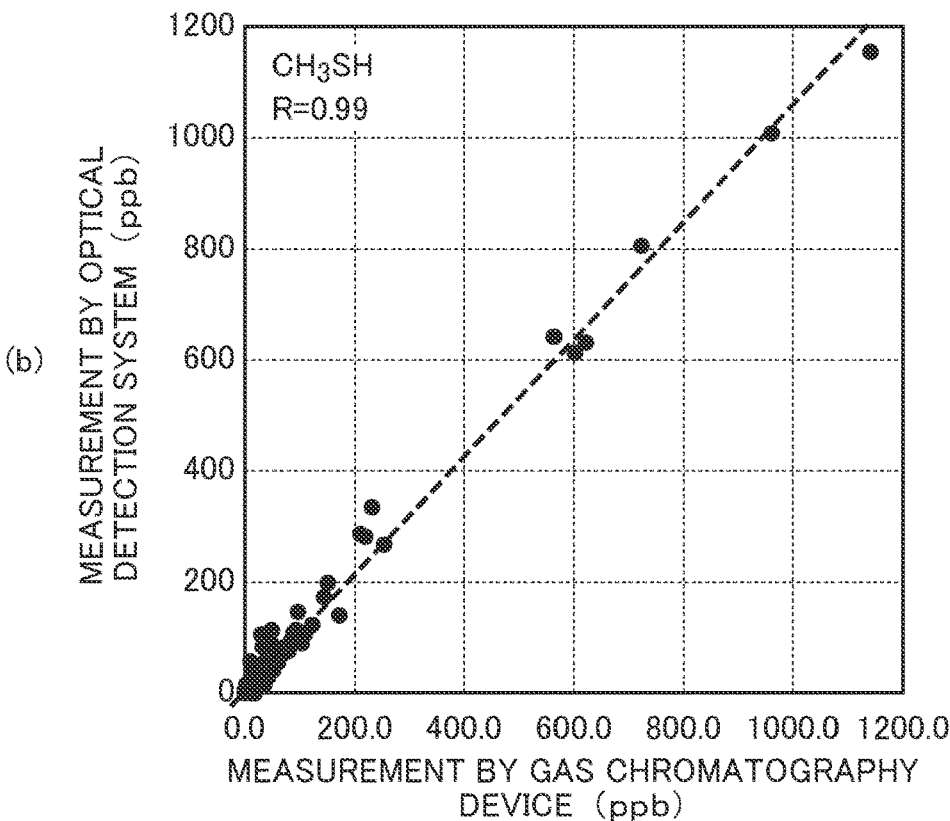

FIG. 12 depicts graphs showing a correlation between an optical detection system of the present invention and a gas chromatography device for (a) hydrogen sulfide and (b) methyl mercaptan. A gas subject to detection containing unknown concentrations of hydrogen sulfide and methyl mercaptan was measured by the optical detection system of the present invention and the gas chromatography device. Ten milliliters of the gas subject to detection that has been collected was analyzed by the gas chromatography device and the remaining 10 mL was analyzed by the optical detection system of the present invention. For a configuration of the gas chromatography device, a gas chromatography device (manufactured by Agilent Technologies) and a pulsed flame photometric detector (manufactured by KINRYO ELECTRIC CO., LTD.) were used. A wavelength was centered at 390 nm. As shown in FIG. 12 (*a*) and (*b*), the correlation coefficient R for hydrogen sulfide and methyl mercaptan was 0.95 and 0.99, respectively, both of which show a strong correlation. Therefore, the optical detection system of the present invention has measurement accuracy comparable to the gas chromatography device even for the gas subject to detection.

Furthermore, the gas chromatography device used in this experiment took 8 min to display measurement results, whereas the present invention can display results in 90 seconds. Furthermore, while atypical gas chromatography device requires high-purity hydrogen, high-purity helium, and high-purity air, the optical detection system of the present invention does not require high-purity hydrogen that may be explosive, or high-purity helium that is becoming less available and can make accurate measurements in a short time.

Figure 13:
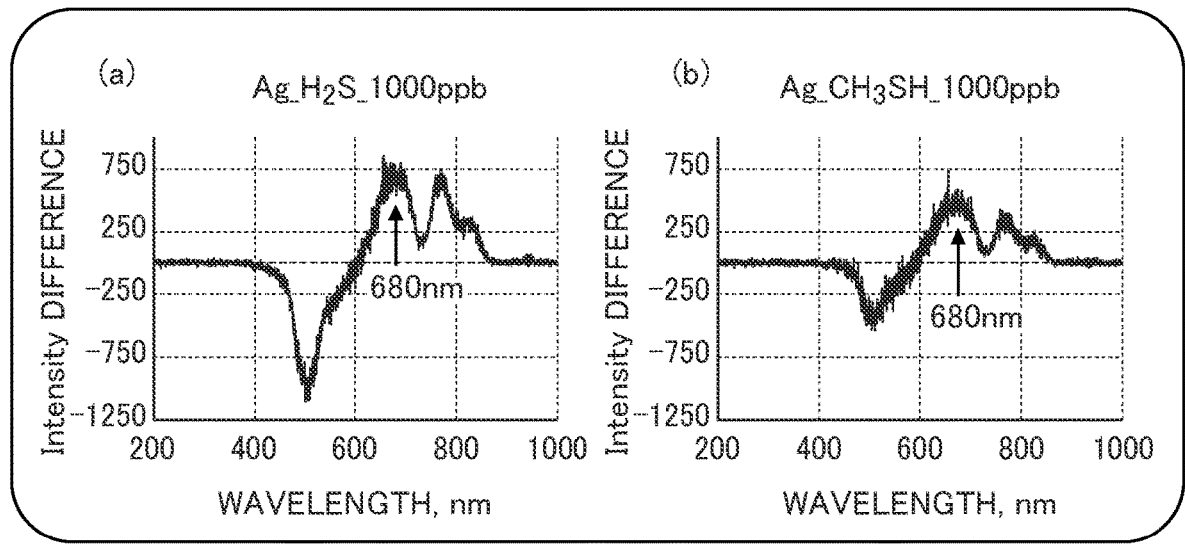
FIG. 13 depicts graphs showing differential spectra showing measurement examples by an optical detection chip of the present invention.

FIG. 13 depicts graphs showing differential spectra indicating measurement examples by an optical detection chip of the present invention. An optical detection device using an optical detection chip of the present invention was connected to a deuterium halogen light source (manufactured by Ocean Insight: DH-2000) with a wavelength of 200 to 1000 nm and a spectrometer (manufactured by Ocean Insight: HR-2000+), and exposed to a gas subject to detection, and then wavelength spectra before and after exposure to the gas subject to detection were recorded and difference spectra were calculated from the thus-obtained wavelength spectra. As the gas subject to detection, each 7 mL of 1.0 ppm hydrogen sulfide and 1.0 ppm methyl mercaptan were exposed to the optical detection chip of the present invention for measurement. A graph in the case where the gas subject to detection was hydrogen sulfide is shown in FIG. 13 (*a*) and a graph in the case where the gas subject to detection was methyl mercaptan is shown in FIG. 13 (*b*). As shown in FIG. 13 (*a*) and FIG. 13 (*b*), the differential spectra are significantly different, demonstrating that hydrogen sulfide and methyl mercaptan were detected.

INDUSTRIAL APPLICABILITY

As can be seen from the above results, the present invention can provide an optical detection chip and an optical detection system that accurately measures concentrations of hydrogen sulfide and methyl mercaptan from a gas subject to detection with comparable accuracy to a gas chromatography device in a short time.

EXPLANATION OF REFERENCE NUMERALS

1 Layer structure
2 Translucent substrate
3 Dye layer
31 Organic dye molecule
32 Metal ion
4 Particle layer
5 Organic compound layer
7 Incoming beam
8 Outgoing beam
10 Optical detection system
111 First filter
112 Second filter
12 Sealed container
121 Pusher block
122 Motor
131 Contaminant removing filter
132 Dehumidifying filter
14 Optical detection chip
141 First optical detection chip
142 Second optical detection chip
151 First optical detection device
152 Second optical detection device
161 First electromagnetic valve
162 Second electromagnetic valve
171 LED
172 PD
191 Resin tube
192 PP nonwoven fabric
193 Zinc sulfate powder
194 Silica wool

The invention claimed is:

1. An optical detection chip comprising:

a translucent substrate; and a layer structure formed on the translucent substrate and comprising a dye layer, the dye layer comprising an organic dye molecule comprising an amino group, a ketone group, or a quinone, and any one or two metal ions selected from the group consisting of Mn, Fe, Co, Ni, Cu, Zn, Cd, Hg, Ag, Pb and Tl, and the dye layer capable of changing color by reacting with a gas subject to detection comprising at least one of hydrogen sulfide or methyl mercaptan.

2. The optical detection chip according to claim 1, wherein the organic dye molecule is 2,6-dichloroindophenol, methylene blue, bromothymol blue, methyl red, or neutral red.

3. The optical detection chip according to claim 1, wherein the translucent substrate is an acrylic resin, a styrene resin, a polyethylene terephthalate resin, a polycarbonate resin, a polypropylene resin, or glass.

4. The optical detection chip according to claim 1, wherein the layer structure comprises a particle layer formed of charged particles having an average particle diameter of 10 to 100 nm between the translucent substrate and the dye layer.

5. The optical detection chip according to claim 4, wherein the charged particles comprise at least one type of inorganic particles selected from the group consisting of titania, silica, and alumina, or at least one type of resin particles selected from the group consisting of an acrylic resin, a styrene resin, a fluororesin, and a silicone resin.

6. The optical detection chip according to claim 4, wherein the layer structure further comprises an organic compound layer formed of an organic compound.

7. The optical detection chip according to claim 6, wherein the organic compound layer is formed of at least one cationic organic compound selected from the group consisting of polyethyleneimine, polyallylamine hydrochloride, polydiallyldimethylammonium chloride, chitosan, polyvinyl pyridine, and polylysine, or at least one anionic organic compound selected from the group consisting of polystyrene sulfonate, polyvinyl sulfate, dextran sulfate, chondroitin sulfate, polyacrylic acid, polymethacrylic acid, polymaleic acid, and polyfumaric acid.

8. The optical detection chip according to claim 1, wherein the optical detection chip is made of a flat plate material having a curved surface portion that reflects light beams entering the translucent substrate, and wherein the layer structure is formed on the curved surface portion.

9. The optical detection chip according to claim 1 for use in detection of hydrogen sulfide or methyl mercaptan comprised in the gas subject to detection.

10. An optical detection system for measuring a concentration of a gas subject to detection comprising at least one of hydrogen sulfide or methyl mercaptan, the system comprising:

a dehumidifying filter that removes moisture from outside air to be introduced to produce dry gas;

a sealed container that encloses the gas subject to detection that has been collected;

a pusher block and a motor that transports the gas subject to detection from the sealed container;

electromagnetic valves that switch a first passage to a second passage, and first and second optical detection devices each comprising a light-emitting diode and a photodiode, wherein in the first passage, the gas subject to detection is passed through a first filter that removes ammonia and phenol and the resulting gas subject to detection is brought into contact with a curved surface portion of a first optical detection chip and, in the second passage, the gas subject to detection is passed through a second filter that removes ammonia, phenol, and hydrogen sulfide and the resulting gas subject detection is brought into contact with a curved surface portion of a second optical detection chip.

11. The optical detection system according to claim 10, wherein the first and second optical detection chips comprise:

a translucent substrate; and a layer structure formed on the translucent substrate and comprising a dye layer, the dye layer comprising an organic dye molecule comprising an amino group, a ketone group, or a quinone, and any one or two metal ions selected from the group consisting of Mn, Fe, Co, Ni, Cu, Zn, Cd, Hg, Ag, Pb and Tl, and the dye layer capable of changing color by reacting with a gas subject to detection comprising at least one of hydrogen sulfide or methyl mercaptan.

12. The optical detection system according to claim 10, wherein the optical detection device measures a change in color of the layer structure.

13. The optical detection system according to any one of claim 10, wherein the first filter comprises calcium acetate and the second filter comprises calcium acetate and zinc sulfate.

* * * * *